Jan. 1, 1924
T. O. ALGER
JUICE EXTRACTOR
Filed May 8, 1923
1,479,125
Fig. 1.    Fig. 3.    Fig. 4.
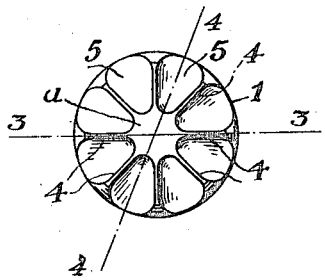 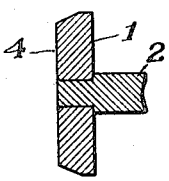 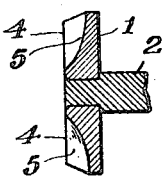
Fig. 2.
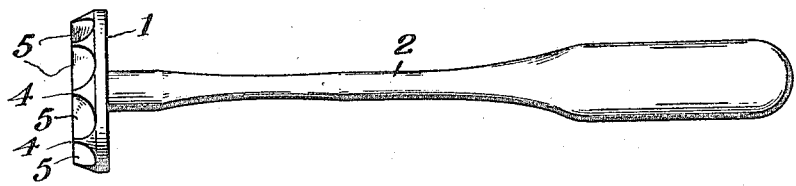
Fig. 5.    Fig. 6.
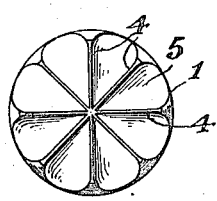 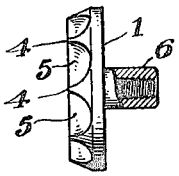
Inventor
Thomas O. Alger
by
Attorney Patented Jan. 1, 1924.

1,479,125

UNITED STATES PATENT OFFICE.

THOMAS O. ALGER, OF BRIDGEPORT, CONNECTICUT.

JUICE EXTRACTOR.

Application filed May 8, 1923. Serial No. 637,413.

*To all whom it may concern:*

Be it known that I, THOMAS O. ALGER, a citizen of the United States, residing at the city of Bridgeport, in the county of Fairfield and State of Connecticut, have invented certain new and useful Improvements in Juice Extractors; and I do declare the following to be a full, clear, and exact description of the invention, such as will enable others skilled in the art to which it appertains to make and use the same.

This invention relates to juice extractors, but more particularly has reference to devices of this description which may be utilized for the purpose of mashing fruits or pressing the juice therefrom when such fruits are contained within comparatively deep receptacles, such as jars, bowls or cups.

In the accompanying drawings—

Figure 1 is a face elevation of the juice extractor head—

Figure 2 a side elevation of the device—

Figure 3 a section at line 3—3 of Figure 1—

Figure 4 a section at line 4—4 of Figure 1—

Figure 5 a view similar to Figure 1, but showing a slight modification, and

Figure 6 a side elevation partly in section, showing a construction of the head adapted for a detachable handle.

Similar numerals of reference denote like parts in the several figures of the drawing.

1 is a circular extractor head and 2 a handle preferably rigid therewith.

4 are ridges in the face of the head all of which extend flush with the outer plane of said head and between these ridges concave depressions 5 are formed which converge at their inner ends and adjoin the central portion of the head in a plane coincident with that of the ridges 4, and these depressions flare outwardly and have their outer perimeters substantially flush with the circumference of the head.

In operating the device the ridges all initially contact the fruit and sink into it when pressure is applied to the handle, and as these ridges are merged into the upper walls of the concave depressions, the latter will cooperate in extracting the juice from the fruit.

While it is preferred to provide a small central face portion, as denoted by $a$ at Figure 1, from which portion the ridges 4 extend radially, nevertheless, these ridges may all intersect the axis of the head, as shown at Figure 5, and the invention is not limited in this respect.

The handle may be detachable from the head by forming on the rear face of the latter a hollow interiorly threaded hub 6, as shown at Figure 6, the inner end of the handle being threaded to engage within this socket.

The device is preferably made of glass with a wooden or aluminum handle, but may also be made entirely of aluminum, wood, or, in fact, any suitable material.

What is claimed is:—

1. A juice extractor comprising a circular head having a handle extending from its rear face, the front face of the head formed with flaring concave depressions which converge toward the center of the head, the side walls of said depressions merging into ridges that are all in one plane at right angles to the axis of said head.

2. A juice extractor comprising a circular head and an elongated handle extending rearwardly therefrom, a series of concave and outwardly flaring depressions formed in the outer face of the head, the side walls of which depressions extend outwardly and merge into radially disposed ridges that are all in one plane.

In testimony whereof I affix my signature hereto.

THOMAS O. ALGER.